United States Patent Office
3,780,043
Patented Dec. 18, 1973

3,780,043
ISOQUINOBENZAZEPINES
Heinz Werner Gschwend, Millburn, N.J., assignor to Ciba-Geigy Corporation, Ardsley, N.Y.
No Drawing. Continuation-in-part of abandoned application Ser. No. 882,300, Dec. 4, 1969. This application June 11, 1971, Ser. No. 152,421
Int. Cl. C07d 35/08
U.S. Cl. 260—286 R         5 Claims

ABSTRACT OF THE DISCLOSURE 5,6,8,9,10,14b-hexahydroisoquino[1,2 - a][2]benzazepines, e.g. those of the formula

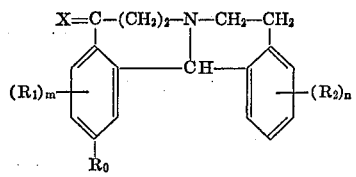

$X=H_2$, HOH or O
$R_0$=alkyl, OH, SH, alkoxy, alkylmercapto, alkanoyloxy or alkanesulfonyloxy
$R_{1,2}$=H, $R_0$, halogen, $CF_3$, $NO_2$ or an amino group
$m,n$=1 or 2 and therapeutically acceptable functional derivatives thereof are antidepressants and tranquilizers.

CROSS-REFERENCES TO RELATED APPLICATIONS

This is a continuation-in-part of application Ser. No. 882,300 filed Dec. 4, 1969, now abandoned.

SUMMARY OF THE INVENTION

The present invention concerns and has for its object the provision of new 5,6,8,9,10,14b-hexahydroisoquino-[1,2-a][2]benzazepines, preferably of those corresponding to Formula I

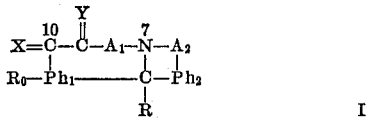

in which each of $Ph_1$ and $Ph_2$ is a 1,2-phenylene radical, $R_0$ is lower alkyl, hydroxy, mercapto, lower alkoxy, lower alkylmercapto, lower alkanoyloxy or alkanesulfonyloxy positioned para to CX, R is hydrogen or lower alkyl, $A_1$ is lower alkylidene, $A_2$ is lower alkylene separating $Ph_2$ from the nitrogen atom by 2 carbon atoms, X represents 2 hydrogen atoms, hydrogen or lower alkyl and hydroxy, lower alkylidene or oxo, and Y represents 2 hydrogen atoms or, when X is oxo, (hydroxy or amino)-lower alkylidene, of therapeutically acceptable functional derivatives thereof, as well as of corresponding pharmaceutical compositions and of methods for the preparation and application of these products, which are useful antidepressants and tranquilizers.

DESCRIPTION OF THE PREFERRED EMBODIMENT

The 1,2-phenylene radicals $Ph_1$ and $Ph_2$ are unsubstituted or substituted by one or more than one, preferably by up to three advantageously one or two, of the same or different substituents selected from the group consisting of lower alkyl, e.g. methyl, ethyl, n- or i-propyl or -butyl; free, etherified or esterified hydroxy or mercapto, such as lower alkoxy or alkylmercapto, e.g. methoxy, ethoxy, n- or i-propoxy or -butoxy; methyl- or ethylmercapto; lower alkanoyloxy or alkanesulfonyloxy, e.g. acetoxy or propionyloxy; methane- or ethanesulfonyloxy; halogeno, e.g. fluoro, chloro or bromo, trifluoromethyl, nitro, amino, mono- or di-lower alkylamino, e.g. dimethylamino or diethylamino. One of said radicals being either lower alkyl, hydroxy, mercapto, lower alkoxy, alkylmercapto, alkanoyloxy or alkanesulfonyloxy, i.e. $R_0$, occupies that position of $Ph_1$, which is para to CX. The term "lower," referred to above and hereinafter in connection with organic radicals or compounds respectively, defines such with up to 7, preferably up to 4, carbon atoms.

Preferred radicals $Ph_1$ are 4-$R_0$-1,2-phenylene, (lower alkyl)-4-$R_0$-1,2-phenylene, (hydroxy) - 4 - $R_0$-1,2-phenylene, (lower alkoxy)-4-$R_0$-1,2-phenylene, (lower alkoxy)-(hydroxy) - 4 - $R_0$-1,2-phenylene, (halogeno)-4-$R_0$-1,2-phenylene, (trifluoromethyl)-4-$R_0$-1,2-phenylene, (nitro)-4-$R_0$-1,2-phenylene or (amino) - 4 - $R_0$-1,2-phenylene, wherein $R_0$ is lower alkyl, hydroxy, lower alkoxy, lower alkanoyloxy or lower alkanesulfonyloxy. Preferred radicals $Ph_2$ are 1,2-phenylene, (lower alkyl)-1,2-phenylene, (hydroxy)-1,2-phenylene, (lower alkoxy)-1,2-phenylene, (lower alkoxy)-(hydroxy)-1,2-phenylene, (halogeno)-1,2-phenylene, (trifluoromethyl) - 1,2 - phenylene, (nitro)-1,2-phenylene or (amino)-1,2-phenylene.

The radical R represents preferably a hydrogen atom, but also lower alkyl, above all methyl.

The lower alkylidene radical $A_1$ is preferably methylidene, but also, for example, ethylidene, 1- or 2-propylidene or -butylidene.

The lower alkylene radical $A_2$ is preferably ethylene, but also, for example, 1,2-propylene, 1,2- or 2,3-butylene.

The radical X represents preferably oxo or hydrogen and hydroxy, but also, for example, methyl or ethyl and hydroxy; methylidene or ethylidene, or two hydrogen atoms.

The radical Y stands preferably for two hydrogen atoms, but in case X is oxo, it represents also (hydroxy, di-lower alkylamino, lower alkyleneimino, di-lower alkylamino-lower alkylamino or lower alkyleneimino-lower alkylamino)-lower alkylidene, wherein two nitrogen atoms are separated from each other by at least 2 carbon atoms, e.g. (dimethylamino, diethylamino, pyrrolidino, piperidino, 2-dimethylaminoethylamino, 3-dimethylaminopropylamino or 2-pyrrolidinoethylamino)-methylidene.

Functional derivatives of the compounds of Formula I are, for example, N-oxides, lower alkyl quaternaries or preferably acid addition salts, furthermore the oxime or lower alkylene ketals of the compounds in which X is oxo, or acyl derivatives of said oxime or of the compounds in which X is hydrogen or lower alkyl and hydroxy and/or $Ph_{1,2}$ is an (amino)-1,2-phenylene. Said acyl derivatives are preferably those of lower alkanoic, $HPh_2$-lower alkanoic or N-(lower alkyl or $HPh_2$)-carbamic acids, e.g. acetic, propionic, pivalic, benzoic, phenylacetic or N-(methyl, ethyl, n- or i-propyl or -butyl, phenyl, tolyl or anisyl)-carbamic acid.

The compounds of the invention exhibit valuable pharmacological properties, for example, imipramine-type antidepressant and chlordiazepoxide-type tranquilizing effects. This can be demonstrated in animal tests, using advantageously mammals, such as mice, rats or monkeys, as test objects. The compounds of the invention can be applied to the animals enterally, e.g. orally, or parenterally, e.g. subcutaneously or intraperitoneally, e.g. in the form of aqueous solutions or suspensions. The dosage may range between about 1 and 300 mg./kg./day, preferably between about 2.5 and 100 mg./kg./day, advantageously between about 5 and 25 mg./kg./day.

An antidepressant effect is observed at the lower dosage levels of said dosage ranges, for example, in the amphetamine interaction test (P. Carlton, Psychopharmacologia 1961, vol. II, p. 364) performed with male albino rats, which are trained to press a bar every 30 seconds, in order to avoid an electric shock applied through the floor grid. In case the animals receive i.p. 0.25 mg./kg./day of amphetamine, their performing rate for avoiding said shocks during a test period of about 4–5 hours is slightly higher than that of placebo (saline) treated animals. In case the animals receive the compounds of the invention (or imipramine for control purposes) in the above-mentioned doses, preferably at 5 to 10 mg./kg./day i.p. and about 45 minutes later the amphetamine, their rate of avoiding the shocks is highest, as compared with that of rats receiving (a) saline alone, (b) saline and amphetamine, or (c) the compounds of the invention and saline.

A tranquilizing effect is observed, at the higher dosage levels, for example, in the mice jiggle cage or rat light box test, where reduced spontaneous motor activity is recorded, by the protection against electroshock-induced seizures or the reduction of hyper-reactivity of septal-lesioned rats. Accordingly, the compounds of the invention are useful antidepressants and tranquilizers in the treatment or management of exo- or endogenous depressions, psychoneuroses and states of anxiety and tension. They are also valuable intermediates in the preparation of other useful products, especially of pharmacologically active compounds.

Particularly useful are compounds of Formula I, in which $Ph_1$ is 4-$R_0$-1,2-phenylene, (lower alkyl)-4-$R_0$-1,2-phenylene, (hydroxy)-4-$R_0$-1,2-phenylene, (lower alkoxy)-4-$R_0$-1,2-phenylene, (lower alkoxy)-(hydroxy)-4-$R_0$-1,2-phenylene, (halogeno)-4-$R_0$-1,2-phenylene, (trifluoromethyl)-4-$R_0$-1,2-phenylene, (nitro)-4-$R_0$-1,2-phenylene or (amino)-4-$R_0$-1,2-phenylene, wherein $R_0$ is lower alkyl, hydroxy, lower alkoxy, lower alkanoyloxy or lower alkanesulfonyloxy, $Ph_2$ is 1,2-phenylene, (lower alkyl)-1,2-phenylene, (hydroxy)-1,2-phenylene, (lower alkoxy)-1,2-phenylene, (lower alkoxy)-(hydroxy)-1,2-phenylene, (halogeno)-1,2-phenylene, (trifluoromethyl)-1,2-phenylene, (nitro)-1,2-phenylene or (amino)-1,2-phenylene, R is hydrogen or lower alkyl, $A_1$ is lower alkylidene, $A_2$ is lower alkylene separating $Ph_2$ from the nitrogen atom by 2 carbon atoms, X represents 2 hydrogen atoms, hydrogen or lower alkyl and hydroxy, lower alkylidene or oxo and Y represents 2 hydrogen atoms or, when X is oxo, (hydroxy, di-lower alkylamino, lower alkyleneimino, di-lower alkylamino-lower alkylamino or lower alkyleneimino-lower alkylamino)-lower alkylidene, or the N-oxide, a lower alkyl quaternary or therapeutically useful acid addition salt thereof, the oxime or a lower alkylene ketal of the compounds in which X is oxo, or a lower alkanoyl, H$Ph_2$-lower alkanoyl or N-(lower alkyl or H$Ph_2$)-carbamoyl derivative of the oxime or of the compounds in which X is hydrogen or lower alkyl and hydroxy, or $Ph_1$ or $Ph_2$ is an (amino)-1,2-phenylene.

Preferred compounds of the invention are those of Formula II

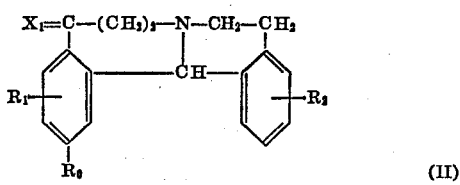

(II)

wherein $R_0$ is lower alkyl, hydroxy, lower alkoxy, lower alkanoyloxy or lower alkanesulfonyloxy, each of $R_1$ and $R_2$ is hydrogen, lower alkyl, lower alkoxy or halogeno, and $X_1$ is oxo or hydrogen and hydroxy, the N-oxide, a lower alkyl quarternary or therapeutically useful acid addition salt thereof.

Especially valuable are the compounds of Formula II wherein $R_0$ is methyl, hydroxy, methoxy, acetoxy or methanesulfonyloxy, each of $R_1$ and $R_2$ is hydrogen, methyl, methoxy or chloro and $X_1$ is oxo or hydrogen and hydroxy, the N-oxide, or a therapeutically useful acid addition salt thereof.

The compounds of this invention are prepared according to ring-closure methods known per se. For example, they are obtained by ring-closing a compound of Formula III

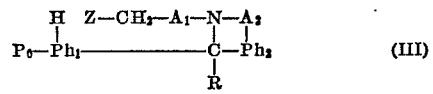

(III)

wherein Z is a free or reactively converted carboxy group and, if desired, converting any resulting product into another compound of the invention.

The ring-closure is performed with the aid of an acidic dehydration agent, advantageously polyphosphoric acid or a polyester thereof, e.g. the polyethyl ester, but also, for example, phosphorus pentoxide or phosphorus oxychloride.

Any resulting compound of Formula I in which X is oxo, can be subjected to oxime or ketal formation or to reduction, for example, with the use of the respective conventional agents useful in the conversion of ketones, such as hydroxylamine, lower alkylene glycols, e.g. ethylene or 1,2-propylene glycol, Grignard-compounds or complex light metal hydrides, e.g. lower alkyl magnesium halides, lithium aluminum hydride or sodium borohydride, metallic alkoxides, e.g. aluminum alkoxides according to Meerwein, Ponndorf-Verley, catalytically activated or nascent hydrogen (Clemmensen) or alkaline hydrazine solutions according to Wolff-Kishner (Huang Minlon). Resulting compounds of Formula I, in which X is hydrogen or lower alkyl and hydroxy can be subjected to dehydration or dehydrogenation (oxidation), for example, with the above-mentioned acidic ring-closing agents or with catalytically activated or nascent oxygen respectively, the latter is derived from conventional oxidation agents, such as oxidizing acids or suitable salts or anhydrides thereof, e.g. hypohalous, periodic, chromic or nitric acid, sodium hypochlorite, potassium dichromate or permanganate, chromic, ferric or cupric halides or sulfates, manganese IV, chromium VI, vanadium V, mercuric or silver oxide, in acidic or alkaline media, or according to Oppenauer with the use of metallic alkoxides and simple ketones, e.g. acetone or cyclohexanone. Resulting compounds in which X is oxo, can also be subjected to the action of corresponding lower alkyl formates and alkalies, e.g. alkali metal lower alkoxides, or to formamide-di-lower alkylacetals, e.g. dimethylformamide-diethylacetal, to form the compounds of Formula I, in which Y is (hydroxy- or amino)-lower alkylidene.

So-obtained hydroxy-lower alkylidene derivatives can also be converted into the corresponding amino alkylidene compounds, e.g. by reacting them with primary or secondary amines, e.g. dimethylaminoethylamine or dimethylamine. Resulting oximes, alcohols, prim. or sec. amines can also be acylated, for example, with the use of reactive functional derivatives of the corresponding acids, such as halides or anhydrides thereof, e.g. acetyl or propionyl chloride, acetic anhydride, ketene or methyl-, butyl or phenylisocyanate. Furthermore, nitro groups may be introduced into the $Ph_1$ or $Ph_2$ moieties, e.g. by the action of nitric-sulfuric acid or by pyrolysis of nitrates, advantageously in acidic media, e.g. in trifluoroacetic acid, or nitro groups present therein reduced, e.g. with nascent hydrogen. Resulting prim., sec. or tert. amines can be reacted with reactive esters of the respective alcohols for example, such as a hydrohalic, sulfuric or sulfonic acid, e.g. hydrochloric or hydrobromic acid or a lower alkane or benzene sulfonic acid, e.g. methane, ethane, benzene or p-toluene sulfonic acid, or with corresponding aldehydes or ketones and reducing agents, e.g. formic acid, in order to obtain sec. or tert. amines or quaternaries respectively. Resulting tert. amines can also be converted into N-oxides or sec. amines, for example, by treating them with oxidation or acylating agents respectively, e.g. hydrogen peroxide, aliphatic or aromatic percarboxylic acids, or haloformic acid esters. Finally, a resulting base can be converted into a corresponding acid addition salt, preferably with the use of a therapeutically useful acid or anion exchange preparation or resulting salts can be converted into the corresponding free bases, for example, with the use of a base, such as a metal hydroxide, basic salt, ammonia, amine or cation exchange preparation, e.g. an alkali metal hydroxide or carbonate. Said acid addition salts are preferably such of therapeutically useful inorganic or organic acids, such as strong metalloidic acids, for example hydrohalic, e.g. hydrochloric or hydrobromic acid, sulfuric, phosphoric, nitric or perchloric acid; aliphatic or aromatic carboxylic or sulfonic acids, e.g. formic, acetic, propionic, succinic, glycolic, lactic, maleic, tartaric, citric, ascorbic, maleic, hydroxymaleic, pyroracemic, phenylacetic, benzoic, 4-aminobenzoic, anthranilic, 4-hydroxybenzoic, salicylic, 4-aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic, sulfanilic or cyclohexylsulfamic acid; methionine, tryptophane, lysine and arginine.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a compound is referred to in this context, a corresponding salt is also intended, provided such is possible or appropriate under the circumstances. Resulting mixtures of isomers can be separated into the single isomers by methods in themselves known, e.g. by fractional distillation, crystallization and/or chromatography.

The invention further includes any variant of the present process in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. Mainly those starting materials should be used in the reactions of the invention that lead to the formation of those compounds indicated above as being especially valuable.

The starting material is known or, if new, may be prepared according to methods known per se, e.g. those described in U.S. Pat. 3,420,818 and illustrated by the examples herein.

The pharmacologically active compounds of the invention are useful in the manufacture of pharmaceutical compositions containing an effective amount thereof in conjunction or admixture with excipients suitable for either enteral or parenteral application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica talcum, stearic acid, its magnesium or calcium salt and/or polyethyleneglycol, for tablets also, (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories are advantageously fatty emulsions or suspensions. They may be sterilized and/or contain adjuvants, such as preserving, stabilizing, wetting or emulsifying agents, solution promoters, salts for regulating the osmotic pressure and/or buffers. They may also contain other therapeutically valuable substances. Said pharmaceutical compositions are prepared according to conventional mixing, granulating or coating methods respectively and contain about 0.1 to 75%, preferably about 1 to 50% of the active ingredient.

The following examples illustrating the invention are not to be construed as being limitations thereon. Temperatures are given in degrees centigrade and all parts wherever given are parts by weight.

Example 1

The mixture of 49 g. 1-(3-methoxyphenyl)-2-(2-carboxyethyl)-1,2,3,4-tetrahydroisoquinoline hydrochloride and 345 g. polyphosphoric acid is stirred at 120° for 4 hours. The hot mixture is poured onto ice, made basic with 900 ml. 30% aqueous sodium hydroxide and the pH finally adjusted to about 8–9 with sodium carbonate. The mixture is extracted with chloroform-methylene chloride (1:1), the extract dried and evaporated. The residue is taken up in the minimum amount of ethanol, the solution neutralized with ethereal hydrogen chloride and the precipitate formed filtered off, to yield the 13-methoxy-10-oxo-5,6,8,9,10,14b-hexahydroisoquino[1,2-a][2]benzazepine hydrochloride of the formula

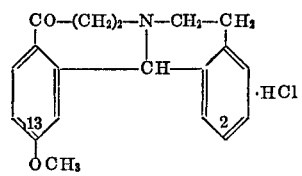

melting at 234–236°; the corresponding base, liberated therefrom, melts at 111–113°.

The starting material is prepared as follows: To the stirred solution of 82.7 ml. 2-phenethylamine and 110 ml. triethylamine in 400 ml. methylene chloride, 113 g. 3-methoxybenzoyl chloride in 450 ml. methylene chloride are added at such a rate that gentle refluxing of the mixture is maintained. After 1¾ hours, 400 ml. methylene chloride are added and the mixture stirred at room temperature for 1 hour. It is washed with water and aqueous sodium carbonate, dried, evaporated and the residue recrystallized from diethyl ether, to yield the N-(2-phenylethyl)-3-methoxybenzamide melting at 58–60°.

To the solution of 70 g. thereof in 370 ml. warm xylene, 93 g. phosphorus pentoxide are added while stirring and the mixture refluxed for 2 hours. After cooling to 0°, water is added, the organic layer diluted with diethyl ether and separated from the acidic solution. The latter is made basic with 30% aqueous sodium hydroxide, extracted with diethyl ether, the extract dried and evaporated, to yield the 1-(3-methoxyphenyl)-3,4-dihydroisoquinoline.

To the solution of 44 g. thereof in 1375 ml. ethanol, 14 g. sodium borohydride are added portionwise and the mixture stirred at room temperature for 16 hours. The mixture is evaporated in vacuo, the residue taken up in water, the solution acidified with 5 N hydrochloric acid, the solution stirred for 1½ hours and made basic with sodium carbonate. It is extracted with methylene chloride, the extract dried and evaporated, to yield the 1-(3-methoxyphenyl)-1,2,3,4-tetrahydroisoquinoline.

The mixture of 32 g. thereof, 43.2 ml. ethyl acrylate and 145 ml. ethanol is refluxed for 20 hours and evaporated in vacuo, to yield the 1-(3-methoxyphenyl)-2-(2-carbethoxyethyl)-1,2,3,4-tetrahydroisoquinoline.

The mixture of 44.8 g. thereof, 105 ml. ethanol and 140 ml. N aqueous sodium hydroxide is refluxed for 24 hours and concentrated. The concentrate is washed with diethyl ether, combined with 140 ml. N hydrochloric acid and extracted with methylene chloride. The extract is dried, evaporated, the residue taken up in 500 ml. acetate and the solution neutralized with ethereal hydrogen chloride, to yield the 1-(3-methoxyphenyl)-2-(2-carboxyethyl) - 1,2,3,4-tetrahydroisoquinoline hydrochloride melting at 204–206°.

Example 2

The mixture of 10 g. 1-(2,3 - dimethoxyphenyl)-2-(2-carboxyethyl) - 1,2,3,4-tetrahydroisoquinoline hydrochloride and 75 g. polyphosphoric acid is stirred at 110° for 4 hours. The hot mixture is poured onto ice, the mixture made basic with 30% aqueous sodium hydroxide to a pH 8–9 and extracted with methylenechloride. The extract is washed with water, dried, evaporated and the residue taken up in diethyl ether. The solution is filtered through a short column of basic aluminum oxide (Activity I), the filtrate evaporated, the residue taken up in the minimum amount of acetone and the solution neutralized with ethereal hydrogen chloride, to yield the 13,14-dimethoxy-10 - oxo-5,6,8,9,10,14b-hexahydroisoquino[1,2-a][2]benzazepine hydrochloride of the formula

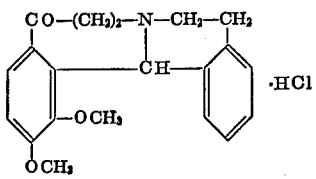

melting at 179–180°.

The starting material is prepared as follows: To the stirred mixture of 93 ml. 2-phenethylamine, 123 ml. triethylamine and 500 ml. methylene chloride, the solution of 147 g. 2,3-dimethoxybenzoyl chloride in 600 ml. methylene chloride is added at such a rate that gentle refluxing is maintained. After completed addition, the mixture is stirred for an additional 2 hours, washed with water and aqueous sodium carbonate, dried and evaporated. The residue is recrystallized from diethyl ether-petroleum ether (5:1), to yield the N-(2-phenethyl)-2,3-dimethoxybenzamide melting at 53–55°.

To the solution of 57 g. thereof in 300 ml. xylene, 68 g. phosphorus pentoxide are added while stirring and the mixture refluxed for 2 hours. It is cooled to 0° and combined with water and diethyl ether. The aqueous phase is separated, made basic wtih 30% aqueous sodium hydroxide, extracted with diethyl ether, the extract dried and evaporated, to yield the 1 - (2,3-dimethoxyphenyl)-3,4-dihydroisoquinoline.

To the stirred solution of 31 g. thereof in 1 liter ethanol, 8.8 g. sodium borohydride are added portionwise and stirring is continued for 16 hours at room temperature. The mixture is evaporated in vacuo, the residue taken up in water, the solution acidified with 5 N hydrochloric acid and the mixture stirred for 1 hour. It is made basic with sodium carbonate, extracted with methylene chloride, the extract dried and evaporated, to yield the 1-(2,3-dimethoxyphenyl)-1,2,3,4-tetrahydroisoquinoline.

The mixture of 28.2 g. thereof, 34 ml. ethyl acrylate and 100 ml. ethanol is refluxed for 24 hours under nitrogen and evaporated in vacuo, to yield the 1-(2,3-dimethoxyphenyl)-2-(2-carbethoxyethyl)-1,2,3,4-tetrahydroisoquinoline.

The mixture of 35.8 g. thereof, 80 ml. ethanol and 113 ml. N aqueous sodium hydroxide is refluxed for 16 hours and concentrated in vacuo. The concentrate is washed with diethyl ether, combined with 113 ml. N hydrochloric acid and extracted with methylene chloride. The extract is dried, evaporated, the residue taken up in acetone and the solution neutralized with ethereal hydrogen chloride, to yield the 1-(2,3-dimethoxyphenyl)-2-(2-carboxyethyl)-1,2,3,4 - tetrahydroisoquinoline hydrochloride melting at 118–120°.

Example 3

The mixture of 20 g. 1-(3,4,5-trimethoxyphenyl)-2-(2-carboxyethyl) - 1,2,3,4-tetrahydroisoquinoline and 140 g. polyphosphoric acid is heated for 2 hours to 120° and poured onto ice. The mixture is adjusted to pH 6.5 with 30% aqueous sodium hydroxide and extracted with methylene chloride. It is further adjusted to pH 7, again extracted with methylene chloride and the combined extracts evaporated in vacuo. The residue is taken up in 150 ml. acetone and the solution neutralized with ethereal hydrogen chloride, to yield the 11-hydroxy-12,13-dimethoxy-10-oxo - 5,6,8,9,10,14-hexahydroisoquino[1,2-a][2]benzazepine hydrochloride of the formula

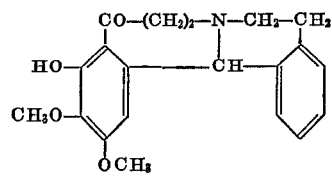

melting at 223–225°.

The starting material is prepared according to the method described in the previous examples, it melts at 232–233°.

Example 4

The mixture of 8 g. 1-(3-tolyl)-2-(2-carboxyethyl)-1,2,3,4-tetrahydroisoquinoline hydrochloride and 70 g. polyphosphoric acid is stirred at 150° for 2 hours. The hot mixture is poured onto ice, made basic with 30% aqueous sodium hydroxide to pH 9 and extracted with chloroform. The extract is dried, evaporated, the residue taken up in diethyl ether and the solution filtered through a small column of basic aluminum oxide (Activity I). The filtrate is evaporated, the residue taken up in the minimum amount of acetone and the solution neutralized with ethereal hydrogen chloride, to yield the 13-methyl-10-oxo-5,6,8,9,10,14b-hexahydroisoquino[1,2-a][2]benzazepine hydrochloride of the formula

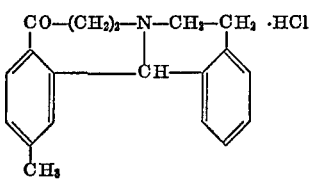

melting at 191–193°.

The starting material is prepared according to the method described in the previous examples, it melts at 202°.

Example 5

To the solution of 5 g. 13-methoxy-10-oxo-5,6,8,9,10,14b-hexahydroisoquino[1,2-a][2]benzazepine in 180 ml. ethanol, 0.7 g. sodium borohydride are added while stirring at 0° and stirring is continued for 16 hours at room temperature. The mixture is evaporated in vacuo, the residue taken up in water, the mixture acidified with 5 N hydrochloric acid and stirred at room temperature for 1 hour. It is made basic with sodium carbonate, extracted with methylene chloride, the extract dried, evaporated and the residue taken up in 100 ml. diethyl ether. The solution is filtered through a short column of diatomaceous earth and allowed to stand at room temperature. The first precipitate formed is filtered off, to yield the trans-13-methoxy - 10 - hydroxy - 5,6,8,9,10,14b - hexahydroisoquino [1,2-a][2]benzazepine of the formula

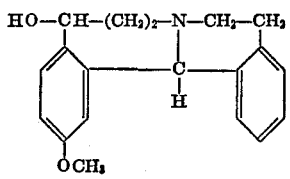

melting at 115–117°. From the mother liquors a second crop of the trans-10-hydroxy compound is obtained melting at 113–115°.

Both crops are combined, dissolved in 50 ml. acetone and the solution neutralized with etheral hydrogen chloride to yield the corresponding hydrochloride melting at 228–229°.

Example 6

The mixture of 0.5 g. 13-methoxy-10-oxo-5,6,8,9,10, 14b-hexahydroisoquino[1,2-a][2]benzazepine and 2 ml. dimethylformamide diethylacetal is refluxed under nitrogen for 1 hour. After cooling the mixture is filtered, the filtrate diluted with diethyl ether, filtered again and the residues combined, to yield the 9-dimethylaminomethylidene-13-methoxy-10 - oxo - 5,6,8,9,10,14b - hexahydroisoquino[1,2-a][2]benzazepine of the formula

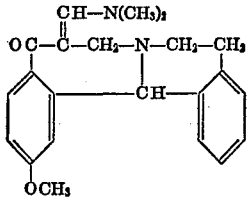

melting at 240–245°. After recrystallization from methylene chloride-diethyl ether an isomorphous form thereof is obtained, melting at 209–210°.

Example 7

The mixture of 6.6 g. 13-methoxy-10-oxo-5,6,8,9,10, 14b-hexahydroisoquino[1,2-a][2]benzazepine hydrochloride, 4.45 g. hydroxylamine hydrochloride and 62 ml. pyridine is stirred at 55° for 17 hours and evaporated in vacuo. The residue is taken up in methylene chloride, the solution washed with aqueous sodium bicarbonate, dried and evaporated. The residue is taken up in diethyl ether, the solution filtered through a short column of diatomaceous earth, the filtrate concentrated to about 30 ml., to yield the 13-methoxy-10-oximino-5,6,8,9,10,14b - hexahydroisoquino[1,2-a][2]benzazepine of the formula

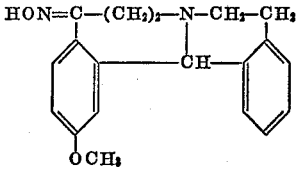

melting at 204–205°.

3.3 g. thereof are taken up in 120 ml. ethanol and the solution neutralized with ethereal hydrogen chloride, to yield the corresponding hydrochloride melting at 228–230°.

Example 8

The mixture of 3.08 g. 13-methoxy-10-oximino-5,6,8,9, 10,14b-hexahydroisoquino[1,2-a][2]benzazepine, 1.5 ml. 4-methoxyphenylisocyanate and 20 ml. tetrahydrofuran is refluxed for 4 hours under nitrogen and evaporated in vacuo. The residue is taken up in methylene chloride, the solution washed with water and aqueous sodium bicarbonate, dried and evaporated in vacuo. The residue is taken up in 40 ml. ethanol and the solution neutralized with ethereal hydrogen chloride to yield the corresponding urethane hydrochloride of the formula

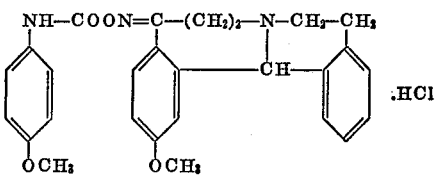

melting at 200–201°.

By replacing the 4-methoxyphenyl-isocyanate by the same amount of n-butyl-isocyanate the corresponding urethane hydrochloride is obtained, melting at 190–192°.

Example 9

The mixture of 6.1 g. 7-chloro-1-(3-methoxy-phenyl)-2-(2-carboxyethyl)-1,2,3,4-tetrahydroisoquinoline hydrochloride and 150 g. polyphosphoric acid is stirred at 120° for 3 hours. It is poured onto ice, made basic with aqueous sodium hydroxide to pH 8–9 and extracted with methylene chloride. The extract is dried, evaporated, the residue taken up in acetone, the solution neutralized with ethereal hydrogen chloride and the precipitate formed filtered off, to yield the 2-chloro-13-methoxy-10-oxo-5,6, 8,9,10,14b-hexahydroisoquino[1,2 - a][2]benzazepine hydrochloride of the formula

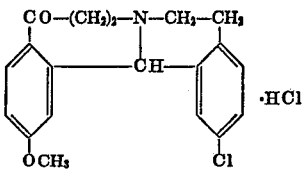

melting at 233–235°.

The first intermediate is prepared according to the method described in Example 1, to yield the N-(4-chlorophenethyl)-3-methoxybenzamide, M.P. 137–139°.

The mixture of 20 g. thereof and 200 g. of polyphosphoric acid polyethyl ester is stirred for 90 minutes at 140° and 15 minutes at 150°. It is poured onto ice, the mixture washed with diethyl ether and ethyl acetate, made basic with aqueous sodium hydroxide and extracted with methylene chloride. The extract is dried and evaporated, to yield the 7-chloro-1-(3-methoxyphenyl)-3,4 - dihydroisoquinoline, which is further converted, analogous to the procedure of Example 1, to the 7-chloro-1-(3-methoxyphenyl) - 2 - (2 - carboxyethyl) - 1,2,3,4 - tetrahydroisoquinoline hydrochloride melting at 204–206°.

Example 10

The mixture of 10.4 g. 1-(3,5-dimethoxyphenyl)-2-(2-carboxyethyl) - 1,2,3,4 - tetrahydroisoquinoline hydrochloride and 90 ml. polyphosphoric acid is stirred at 120° for 130 minutes. It is poured onto ice, made basic with aqueous sodium hydroxide to pH 11 and extracted with methylene chloride. The extract is dried, evaporated, the residue taken up in acetone, the solution neutralized with ethereal hydrogen chloride and the precipitate formed filtered off, to yield the 11,13-dimethoxy-10-oxo-5,6,8,9,10,14b-hexahydroisoquino[1,2-a][2] benzazepine hydrochloride of the formula

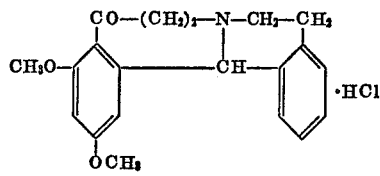

melting at 215–216°.

By adjusting the aqueous layer from pH=1 to about 8 with hydrochloride acid and extracting it as described above, a smaller amount of the 11-hydroxy-13-methoxy-10-oxo-5,6,8,9,10,14b - hexahydroisoquino[1,2-a][2]benzazepine hydrochloride is obtained, M.P. 300°.

The starting material and intermediates are prepared analogous to those described in Example 9:

(a) N-(phenethyl)-3,5-dimethoxy - benzamide, M.P. 77–79°

(b) 1 - (3,5 - dimethoxyphenyl) - 2 - (2 - carboxyethyl)-1,2,3,4-tetrahydroisoquinoline hydrochloride, M.P. 202–204°

Example 11

The mixture of 10 g. 1-(3,5-dimethylphenyl)-2-(2-carboxyethyl) - 1,2,3,4 - tetrahydroisoquinoline hydrochloride and 80 g. polyphosphoric acid is stirred at 140° for 2 hours. It is poured onto ice, made basic with aqueous sodium hydroxide to pH 8–9 and extracted with methylene chloride-chloroform (1:1). The extract is dried, evaporated, the residue taken up in acetone, the solution neutralized with ethereal hydrogen chloride and the precipitate formed filtered off, to yield the 11,13-dimethyl-10-oxo- 5,6,8,9,10,14b - hexahydroisoquino[1,2-a][2]benzazepine hydrochloride of the formula

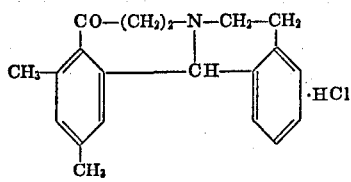

melting at 205–206°.

The starting material is prepared analogous to the method described in Example 1, M.P. 203°.

Example 12

To the solution of 2.7 g. 11,13-dimethyl-10-oxo-5,6,8,9,10,14b-hexahydroisoquino[1,2-a][2]benzazepine in 35 ml. diethyl ether, 0.52 g. of sodium hydride in 10 ml. diethyl ether are added and the mixture stirred for 30 minutes. Thereupon 1.2 ml. ethyl formate and 0.1 ml. ethanol are added and stirring is continued for 5 hours at room temperature. The mixture is cooled in an ice bath, 30 ml. water are added, the aqueous layer separated, neutralized with hydrochloric acid and extracted with methylene chloride. The extract is dried, evaporated and the residue recrystallized from diethyl ether, to yield the 9-hydroxymethylidene-11,13-dimethyl-10-oxo - 5,6,8,9,10,14b-hexahydroisoquino[1,2-a][2]benzazepine of the formula

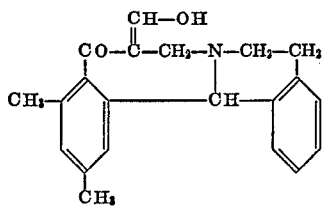

melting at 121–123°.

Example 13

The solution of 3.2 g. of 9-hydroxymethylidene-11,13-dimethyl - 10 - oxo - 5,6,8,9,10,14b - hexahydroisoquino-[1,2-a][2]benzazepine in 20 ml. ethanol is neutralized with ethereal hydrogen chloride, 2 ml. of 3-dimethylaminopropylamine are added and the mixture refluxed for 4 hours. It is evaporated in vacuo, the residue taken up in methylene chloride, the solution washed with aqueous sodium carbonate, dried and evaporated. The residue is taken up in ethanol and the solution neutralized with ethereal hydrogen chloride, to yield the 9-(3-dimethylaminopropylaminomethylidene) - 11,13 - dimethyl - 10 - oxo - 5,6,8,9,10,14b - hexahydroisoquino[1,2 - a][2]benzazepine dihydrochloride of the formula

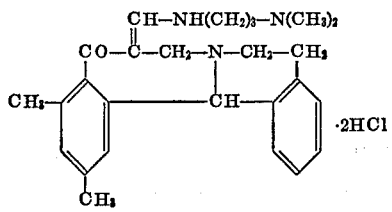

melting at 167–170°.

In the analogous manner the corresponding 9-(2-dimethylaminoethylaminoethylidene)-compound is prepared, the dihydrochloride melts at 180–182°.

Example 14

The mixture of 10 g. 13-methoxy-10-oxo-5,6,8,9,10,14b-hexahydroisoquino[1,2-a][2]benzazepine and 200 ml. of 48% hydrobromic acid is stirred for 18 hours at 120–125°. After cooling, it is neutralized with sodium hydroxide, the pH thereof adjusted to 8 with sodium bicarbonate and extracted with chloroform. The extract is dried, evaporated and the residue recrystallized from chloroform-diethyl ether, to yield the 13-hydroxy-10-oxo-5,6,8,9,10,14-b-hexahydroisoquino[1,2-a][2]benzazepine of the formula

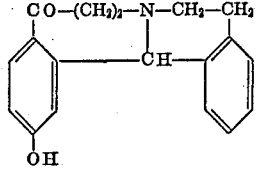

melting at 210–215°. The corresponding hydrochloride melts at 228–230°.

Example 15

To the mixture of 2 g. 13-hydroxy-10-oxo-5,6,8,9,10,14b-hexahydroisoquino[1,2-a][2]benzazepine and 45 ml. tetrahydrofuran, the solution of 0.84 g. acetyl chloride in 25 ml. tetrahydrofuran is added while stirring at room temperature. After 1½ hours, the mixture is diluted with methylene chloride, washed with aqueous sodium bicarbonate, dried and evaporated. The residue is taken up in acetone and the solution neutralized with ethereal hydrogen chloride, to yield the 13-acetoxy-10-oxo-5,6,8,9,10,14b-hexahydroisoquino[1,2 - a][2]benzazepine hydrochloride of the formula

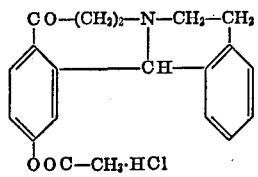

melting at 219–220° C.

Example 16

To the solution of 2.7 g. 13-hydroxy-10-oxo-5,6,8,9,10,14b-hexahydroisoquino[1,2-a][2]benzazepine and 90 ml. tetrahydrofuran, the mixture of 4.5 ml. methanesulfonyl chloride and 4.5 ml. diisopropylethylamine is added while stirring at room temperature. After 5 hours, the mixture is diluted with methylene chloride, washed with aqueous sodium carbonate, dried, evaporated and the residue recrystallized from ethylene chloride-diethyl ether, to yield the 13-methanesulfonyloxy-10-oxo-5,6,8,9,10,14b-hexahydroisoquino[1,2-a][2]benzazepine of the formula

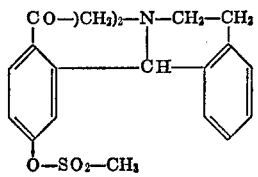

melting at 198–200°. The hydrochloride thereof melts at 235° with decomposition.

Example 17

Preparation of 10,000 tablets each containing 50.0 mg. of the active ingredient:

| Formula: | G. |
|---|---|
| 13-methoxy-10-oxo-5,6,8,9,10,14b - hexahydroisoquino[1,2-a][2]benzazepine hydrochloride | 500.00 |
| Lactose | 1,706.00 |
| Corn starch | 90.00 |
| Polyethylene glycol 6,000 | 90.00 |
| Talcum powder | 90.00 |
| Magnesium stearate | 24.00 |
| Purified water, q.s. | |

Procedure: All the powders are passed through a screen with openings of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml.

water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

Example 18

According to the method described in the previous Examples compounds of Formula II are prepared, wherein each of $R_1$ and $R_2$ is methyl, methoxy, fluoro, chloro or nitro, each of $m$ and $n$ is the integer 1 or 2 and $X_1$ is oxo or hydrogen and hydroxy, the N-oxide, a lower alkyl quaternary or therapeutically useful acid addition salt thereof, e.g. the 2,13- or 12,13-dimethyl-10-oxo-5,6,8,9,10,14b-hexahydroisoquino[1,2-a][2]benzazepine, the 2-chloro-13-methoxy-10-oxo-5,6,8,9,10,14b - hexahydroisoquino[1,2-a][2]benzazepine, the 2,3-dimethoxy-11,13-dimethyl-10-oxo-5,6,8,9,10,14b-hexahydroisoquino[1,2 - a][2]benzazepine, the 2-chloro-13-methyl-10-oxo - 5,6,8,9,10,14b-hexahydroisoquino[1,2 - a][2]benzazepine, the 2,13-dimethoxy-10-oxo-5,6,8,9,10,14b - hexahydroisoquino[1,2-a][2]benzazepine or the 13-methoxy-12-nitro-10-oxo-5,6,8,9,10,14b-hexahydroisoquino[1,2 - a][2]benzazepine, or the hydrochlorides thereof.

Example 19

Preparation of 10,000 tablets each containing 100.0 mg. of the active ingredient:

Formula:                                                    G.
  11,13-dimethyl - 10 - oxo - 5,6,8,9,10,14b-
    hexahyroisoquino[1,2 - a][2]benzaze-
    pine _____ 1,000.00
  Lactose _____ 2,535.00
  Corn starch _____ 125.00
  Polyethylene glycol 6,000 _____ 150.00
  Talcum powder _____ 150.00
  Magnesium stearate _____ 40.00
  Purified water, q.s.

Procedure: All the powders are passed through a screen with openings of 0.6 mm. Then the drug substance, lactose, talcum, magnesium stearate and half of the starch are mixed in a suitable mixer. The other half of the starch is suspended in 65 ml. of water and the suspension added to the boiling solution of the polyethylene glycol in 260 ml. of water. The paste formed is added to the powders which are granulated, if necessary, with an additional amount of water. The granulate is dried overnight at 35°, broken on a screen with 1.2 mm. openings and compressed into tablets using concave punches with 10.3 mm. diameter, uppers bisected.

I claim:

1. A compound corresponding to the formula

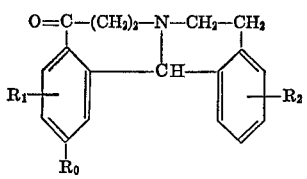

wherein $R_0$ is methyl, hydroxy, methoxy, acetoxy or methanesulfonyloxy, and each of $R_1$ and $R_2$ is hydrogen, methyl, methoxy or chloro, the N-oxide, or a therapeutically useful acid addition salt thereof.

2. A compound as claimed in claim 1 and being the 13-methoxy-10 - oxo - 5,6,8,9,10,14b-hexahydroisoquino[1,2-a][2]benzazepine or a therapeutically useful acid addition salt thereof.

3. A compound as claimed in claim 1 and being the 11,13 - dimethyl - 10 - oxo - 5,6,8,9,10,14b-hexahydroisoquino[1,2-a][2]benzazepine or a therapeutically useful acid addition salt thereof.

4. A compound as claimed in claim 1 and being the 11,13 - dimethyl - 10 - oxo - 5,6,8,9,10,14b-hexahydroisoquino[1,2-a][2]benzazepine hydrochloride.

5. A compound as claimed in claim 1 and being the 13 - methyl - 10 - oxo - 5,6,8,9,10,14b-hexahydroisoquino[1,2-a][2]benzazepine or a therapeutically useful acid addition salt thereof.

No references cited.

ALEX MAZEL, Primary Examiner

J. TOVAR, Assistant Examiner

U.S. Cl. X.R.

260—283 S, 287 R, 288 R, 289 R; 424—258